US005887067A

United States Patent [19]

Costa et al.

[11] Patent Number: 5,887,067

[45] Date of Patent: Mar. 23, 1999

[54] AUDIO COMMUNICATION SYSTEM FOR A LIFE SAFETY NETWORK

[75] Inventors: Hilario S. Costa, Sarasota; Elizabeth Meyer-Horton, Riverview; Donald J. Munn, Bradenton; Andrew Novetzke; Michael K. Slack, both of Sarasota, all of Fla.

[73] Assignee: General Signal Corporation, Stamford, Conn.

[21] Appl. No.: 644,834

[22] Filed: May 10, 1996

[51] Int. Cl.[6] .................... H04B 3/00

[52] U.S. Cl. .................... 381/81; 381/85

[58] Field of Search .................... 381/77, 80, 81, 381/82, 85; 340/825.24, 825.25, 692; 455/226.1, 228

[56] References Cited

U.S. PATENT DOCUMENTS

| | | | |
|---|---|---|---|
| 3,964,047 | 6/1976 | Antonaccio | 340/310.01 |
| 5,034,808 | 7/1991 | Murray | 381/85 |
| 5,345,510 | 9/1994 | Singhi et al. | 381/77 |
| 5,363,434 | 11/1994 | Farinelli et al. | 381/81 |
| 5,548,281 | 8/1996 | Funahashi et al | 381/77 |
| 5,596,647 | 1/1997 | Wakai et al. | 381/77 |

*Primary Examiner*—Vivian Chang
*Attorney, Agent, or Firm*—Ohlandt, Greeley, Ruggiero & Perle

[57] ABSTRACT

There is provided an audio communication system for a life safety system. The audio communication system includes an audio data line having a plurality of audio channels for transmitting audio data and a CPU for controlling the transmission of the audio data along the audio data line. An audio source module and an audio amplifier module are coupled to the audio data line. To produce an audible sound, the CPU selects a particular channel of the plurality of audio channels for transmitting the audio data and sends this selection to the audio source module. The audio source module then places one or more audio packets, corresponding to the audible sound, on the selected channel. The audio amplifier module then receives a signal from the CPU that identifies the selected channel and, thus, the audio amplifier module will know which channel to find the audio packets. The audio packets are converted and directed to speakers to produce the audible sound.

18 Claims, 6 Drawing Sheets

AUDIO COMMUNICATION SYSTEM FOR A LIFE SAFETY NETWORK

RELATED APPLICATIONS

The invention of this application is related to inventions described in five other applications with reference to the same life safety network that are owned by the assignee of the present invention: U.S. patent application Ser. No. 08/644,479 filed on May 10, 1996 entitled Life Safety System Having a Panel Network With Message Priority (Docket No. 100.0607); U.S. patent application Ser. No. 08/644,835 filed on May 10, 1996 entitled Phone Control Center for a Life Safety Network (Docket No. 100.0609); U.S. patent application Ser. No. 08/644,816 filed on May 10, 1996 entitled Automatic Addressing in Life Safety System (Docket No. 100.0610); U.S. patent application Ser. No. 08/644,478 filed on May 10, 1996 entitled Configuration Programming System for a Life Safety Network (Docket No. 100.0611); and U.S. patent application Ser. No. 08/644,815 filed on May 10, 1996 entitled Core Modules for a Life Safety System and Structure for Supporting Such Modules in a Panel Housing (Docket No. 100.0612).

BACKGROUND OF THE INVENTION

I. Field of the Invention

The present invention relates generally to an audio communication system of a life safety system for broadcasting announcements to the public. More particularly, the present invention relates to a voice communication system that may be easily integrated into a life safety system, such as a fire alarm system, for broadcasting pre-recorded safety announcements to people of a particular area, such as building occupants, in emergency and non-emergency situations.

II. Description of the Prior Art

Life safety system are typically used to monitor the safety of a particular area, such as an office building. In order to provide full coverage of the area, sensors and monitoring devices must be situated throughout the area. Similarly, audio and visual warning devices should be provided throughout the area so that all occupants of the area may be warned of important safety situations.

Modem life safety systems are fully integrated so that safety information can be quickly and efficiently disseminated throughout the system. Thus, if a fire is detected at one area of a building, this information would spread throughout the life safety system and a voice announcement would be made to all occupants the evacuate the building. Such integration of life safety systems also provide for efficient transfer of data and configuration of newly installed components.

However, such tight integration of life safety systems do not provide a simple and economic way to provide certain features, such as audio communication systems. In particular, life safety systems do not provide a way to quickly and economically install audio communication systems for transmitting multiple audio signals simultaneously. Under emergency conditions, fast communication of audio signals, and the ability of a life safety system to handle a multitude of audio signals simultaneously is essential. The life safety systems of the prior art tend to be inefficient and are inadequate due to their high manufacturing costs, high installation costs.

SUMMARY OF THE INVENTION

Against the foregoing background, it is a primary object of the present invention to provide an audio communication system for supporting high quality audio for broadcasting safety announcements, such as digital voice messages, that may be easily and economically integrated into a life safety system.

It is another object of the present invention to provide such an audio communication system that may be easily and quickly programmed to provide a wide variety of audio functions and safety announcements.

It is a further object of the present invention to provide such an audio communication system that includes full networking capabilities for efficient communication with the rest of the life safety system.

It is still further object of the present invention to provide such an audio communication system that is tightly integrated so that it is economical to manufacture and easy to install and handle.

To accomplish the foregoing objects and advantages, the present invention, in brief summary, is an audio communication system for a life safety system which comprises an audio line, a central processing unit ("CPU"), an audio source module, an audio amplifier module and an audio device, such as a loud speaker. The audio line transmits audio data and includes a plurality of audio channels. The CPU controls the transmission of the audio data along the audio line and includes means for selecting a particular channel of the plurality of audio channels for transmitting the audio data. The audio source is coupled to the audio line and places a digital audio packet on the particular channel that has been selected by the CPU. The audio amplifier is coupled to the audio line, receives a signal from the CPU that identifies the particular channel, and retrieves the audio packet from the particular channel of the plurality of audio channels. The audio device converts the audio packet to an audible sound.

For the preferred embodiments described herein, the audio data and the audio packet are in digital form and the audio line and audio channels transmit digital data. Also, for the audio device, an analog signal drives a loudspeaker to generate the audible sound.

BRIEF DESCRIPTION OF THE DRAWINGS

The foregoing and still further objects and advantages of the present invention will be more apparent from the following detailed explanation of the preferred embodiments of the invention in connection with the accompanying drawings.

DETAILED DESCRIPTION OF THE PREFERRED EMBODIMENT

A life safety system includes groups or local area networks ("LANs") of intelligent devices in which each group monitors the safety conditions in a particular zone, such as an entire building or a portion thereof. In particular, the life safety system includes a plurality of central processing units ("CPUs") that are linked in series by CPU-to-CPU communication lines. Each CPU controls CPU-to-CPU communications and monitors the environment of a particular zone to determine whether conditions in the zone are safe. If the life safety system determines that the occupants in a particular zone should be warned about an actual or potential unsafe condition, the CPU would undertake the task of providing audio and/or visual warnings to the occupants of its zone. Accordingly, the audio communication system of the present invention provides the CPU with the ability to perform this task as well as any other task where audio communications may be desired.

In order for the CPUs to monitor and control the safety operations in their respective zone, each CPU is networked to a variety of I/O hardware modules or local rail modules ("LRMs") by a plurality of local communication lines or local rails. In each zone, the LRMs provide the CPU with information relating to the safety conditions throughout the zone and assist the CPU in distributing warning signals and messages to the occupants in the zone. The CPU is always a master device on the local rails and, thus, may communicate with any LRM connected to the local rails.

The life safety system supports CPU-to-CPU communication of command/control data, response data, and audio signals between CPUs of different zones. In addition, the system is capable of providing CPU-to-Module communications of power, command/control data, response data, test data and audio signals between a CPU and one of its respective LRMs in a particular zone. Further, the system is capable of providing Module-to-Device communications of power, command/control data, response data, test data and audio signals for life safety devices, such as smoke detectors or audio speakers, that are coupled to a particular LRM. Accordingly, the audio communication system of the present invention provides the life safety system with the ability to control the processing of audio information at the CPUs, LRMs and devices and, also, the distribution of audio information via CPU-to-CPU communications, CPU-to-Module communications and Module-to-Device communications.

Figure 1:
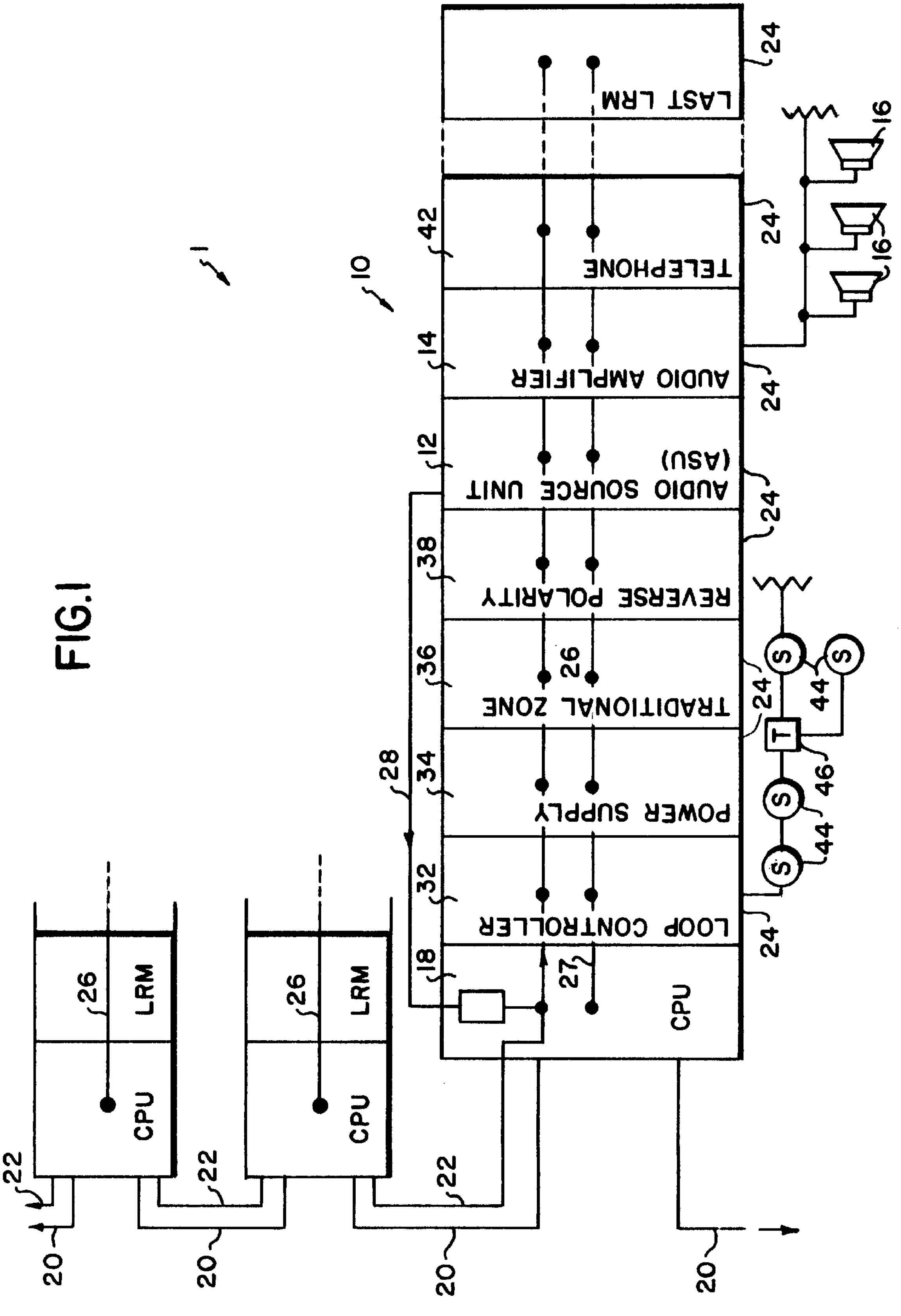
FIG. 1 is a block diagram of the preferred embodiment of the present invention that is integrated in a life safety system.

Referring to the drawings and, in particular, to FIG. 1, there is seen a panel arrangement of the life safety system at a central station or the like which is generally represented by reference numeral 1. The audio communication portion 10 of the panel arrangement 1 comprises an audio source module or unit ("ASU") 12, an audio amplifier module 14, and one or more audio devices or speakers 16 connected to the audio amplifier module. In addition, the audio communication portion 10 includes the CPU 18 for full integration in the life safety system. Thus, audio data functions that are not already available in the CPU are added via an audio data interface and/or downloaded as software to a memory portion of the CPU, described below. It is to be understood that the audio communication portion 10 may have a plurality of ASUs 12, audio amplifier modules 14 and CPUs 18 for more concentrated coverage of the particular zone or for backup capabilities.

As shown in FIG. 1, the CPUs 18 are linked together by general data lines 20 and audio data lines 22 for CPU-to-CPU communications. In addition, each CPU 18 is connected for communication with a plurality of LRMs 24 by one or more local rails 26, 27, which includes a power line, auto-addressing line, audio data line, common alarm indication line, power supply control line, and general data line. The general data line is used for command/control, response data, and test data. The local audio data line 28 which is connected between the CPU 18 and the ASU 12 transfers audio data to the CPU, and the CPU places the audio data on one of the local rails 26, 27. Audio data that is received by the CPU 18 from the ASU 12 is routed through a particular audio circuit 67 (shown in FIG. 3) of the CPU 18 to isolate the audio data from the remote audio data line 22. The CPU 18 also supervises the audio data received from the ASU 12 and buffers the audio data before placing it on the remote audio data line 22. Although not shown in FIG. 1, the local audio data line 28 may be combined with the general data line on the local rails 26, 27 to provide a single communication line so long as the primary functions of these lines, as described below, are not significantly changed.

A wide variety of LRMs 24 may be coupled to the local rails 26, 27. The varying types of LRMs include, but are not limited to, a loop controller module 32, power supply module 34, traditional zone module 36, reverse polarity module 38, ASU 12, audio amplifier module 14 and telephone module 42 as shown in FIG. 1. The loop controller module 32 may be connected to a plurality of devices, such as a plurality of smoke detectors 44 and a transponder 46. Also, as stated above, the audio amplifier module 14 may be connected to a plurality of audio devices or loud speakers 16.

It is to be understood that the local rails 26, 27 shown in FIG. 1 are merely diagrammatic representations of the actual local rails of the preferred embodiment. In particular, the local rails in FIG. 1 are the audio rail 26 and the other rail 27 whereas, for the preferred embodiment, there are actually two local rails each having a plurality of address and data lines (shown in FIG. 2). Thus, the audio portion of the local rails 26, 27 has been distinctly separated from the other portions of the local rails to more clearly describe the present invention.

Figure 2:
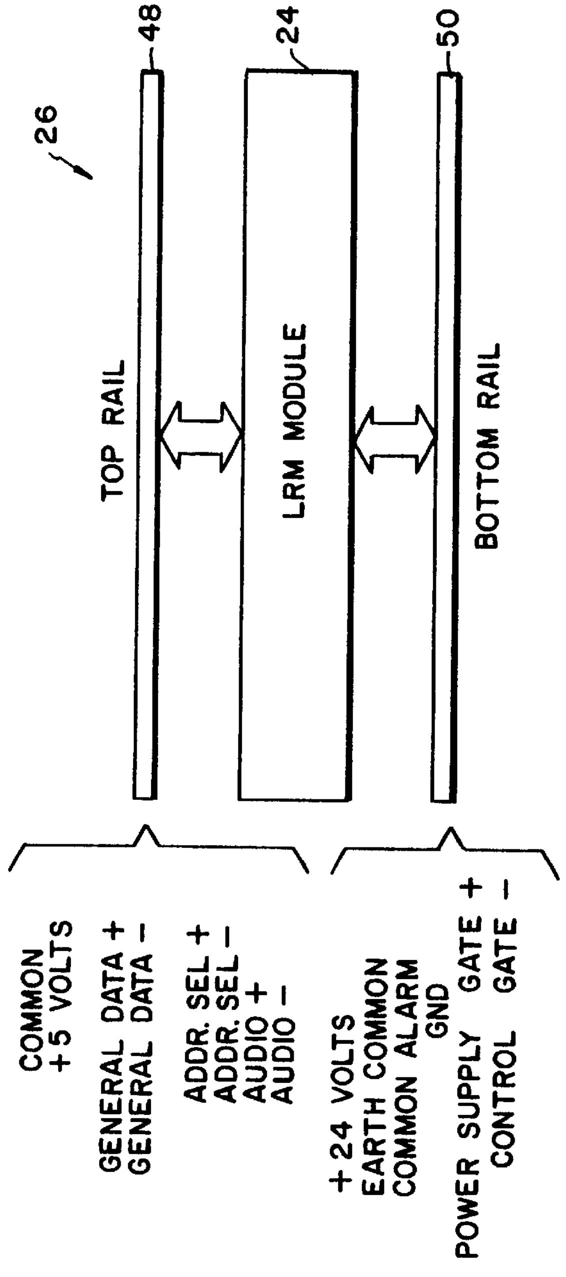
FIG. 2 is a diagrammatic view of the local rails of FIG. 1.

Referring to FIG. 2, the preferred local rails 26, 27 comprises a top rail 48 and a bottom rail 50 in which each rail includes a plurality of communication or power lines. The specific types of signals that may be provided on the local rails 26, 27 include, but are not limited to, general data lines, address lines, selection lines, audio data lines, voltage lines (such as 5 volts or 24 volts), common lines, common alarm, power supply sensing lines, power supply control and/or reference lines and earth ground lines. Thus, the local rails 26, 27 provides communication between the CPU 18 and a particular LRM 24 and between two or more LRMs. For example, an alarm signal corresponding to a particular local alarm condition may be transmitted by an LRM 24 via the local rails 26, 27 so that all other LRMs 24 connected to the local rails 26, 27 will be aware of the condition. In the event of a loss of CPU communications, the LRM 24 will continue to activate the common alarm signal until CPU communications is resumed or the local alarm condition becomes safe.

Referring again to FIG. 1, the preferred embodiment of the audio communication portion 10 comprises a network of up to sixty-four CPUs 18 interconnected by communication lines 20, 22, preferably RS-485 data lines, with each CPU supporting up to nineteen hardware modules LRMs 24 that are responsible for the system input/output functions. The CPU 18 is the local bus master and supervises all bus traffic. For example, the CPU 18 performs built in test functions upon power up and user request via a user interface. Also, the CPU 18 assigns all LRM addresses based on positional priority in which the LRMs 24 closer to the CPU 18 are given higher priority.

Throughout the operation of the audio communication portion 10, possible local alarm conditions are monitored and processed by each LRM 24 on the local rails 26, 27 and appropriate actions in each zone are taken in response to certain conditions. Each LRM 24 must have the capability to function properly in a local alarm condition even when CPU communications has been lost due to CPU, local rails or module problems. Generally during CPU communication loss, the LRM 24 operates independently and maintains the last state commanded by the CPU 18 and continues to queue alarm and exception deltas as necessary.

When a local alarm condition is detected, this condition is broadcast to all CPUs 18. Each CPU 18 that includes at least one ASU 12 on its local rails 26, 27 will inform the ASU or ASUs to broadcast a particular audio signal on one of its eight audio channels. In addition, each CPU 18 that controls an audio amplifier module 14 will inform the local amplifier module to receive input from a specific channel, send output to its speakers, and energize its visual circuit.

Figure 3:
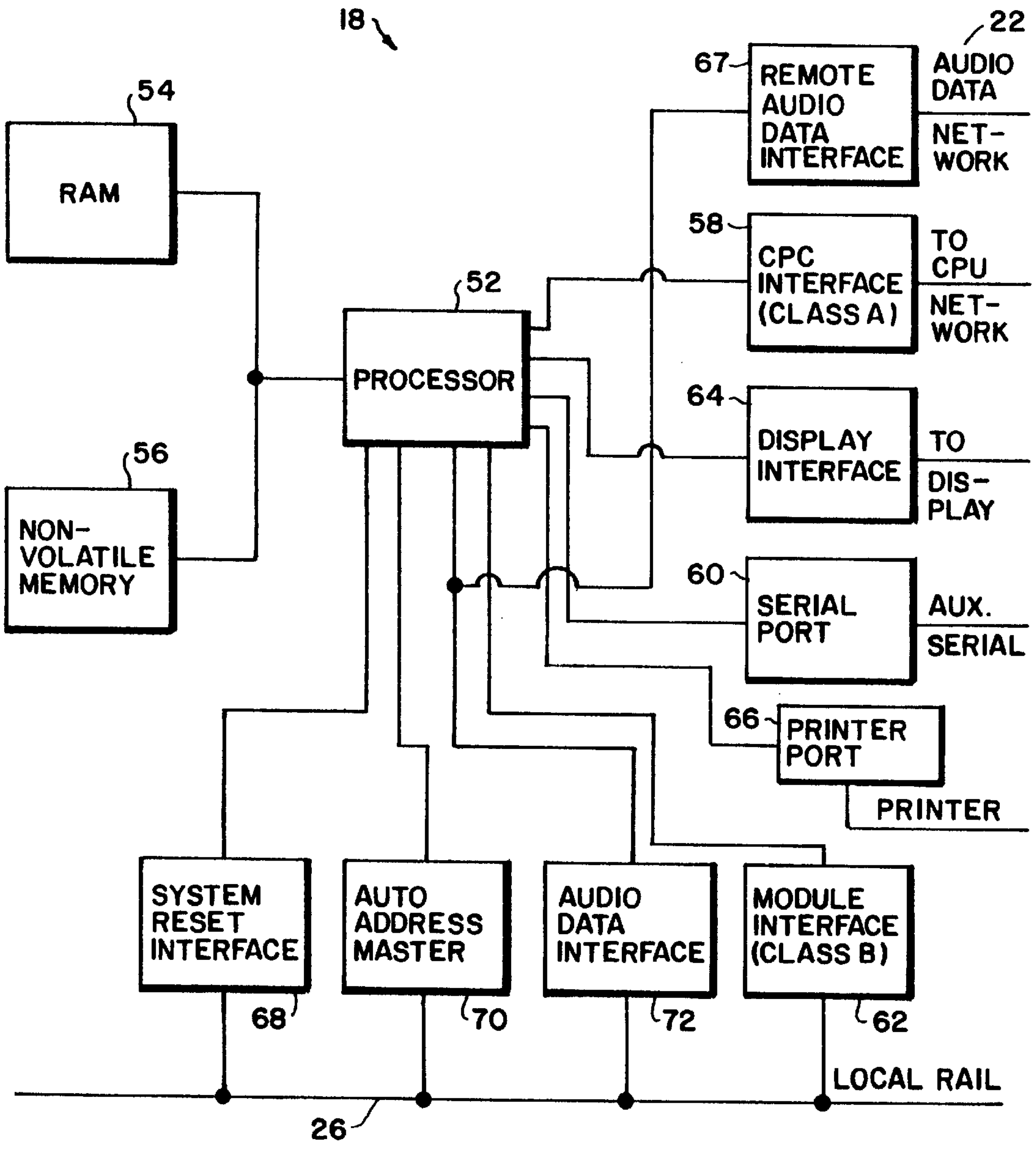
FIG. 3 is a block diagram of a CPU of FIG. 1.

Referring to FIG. 3, the CPU includes a processor 52 connected to a variety of CPU components for controlling CPU's major functions. Preferably, the processor 52 should have a minimum word length of 16 bits and the ability to address more that 16 megabytes of address and I/O space, such as the 68302 processor which is available from Motorola Inc. in Shaumburg, Ill. Operating system software, program software, rail and system wide data, and program data are stored in random access memory ("RAM") 54 and nonvolatile memory 56. Such information may be downloaded from another CPU 18 via a CPU interface 58 or from an external device, such as a personal computer, via a serial port 60. In addition, such information may be downloaded to the respective LRMs 24 connected to the local rails 26, 27 via a module interface 62. The CPU 18 may also interact with a user by receiving instructions from the serial port 60 and sending information to a display via a display interface 64 and a printer via a printer port 66. For the preferred embodiment, the nonvolatile memory 56 stores program and database information, and the RAM 54 stores run-time data.

The processor 52 of the CPU 18 also controls a remote audio data interface 67, system reset interface 68, auto address master 70 and audio data interface 72. The remote audio data interface 67 provides isolation and routing of audio data. The system reset interface 68 implements a watch dog function for recovery from incorrect firmware performance. Thus, the system reset interface 68 drives and detects reset signals. The auto address master 70 permits the processor 52 to determine the address of each LRM connected to the local rails. The audio data interface 72 implements audio data functions, such as support for CPU-to-module communications. Also, where a dedicated audio data line 22 to another CPU and/or a dedicated local audio data line 28 to the LRM 24 is available, such as the preferred embodiment shown in FIG. 1, processor 52 will transmit and receive audio information on such data lines via the audio data interface 72. For those CPUs 18 that do not have an ASU 12 installed on the local rails 26, 27, they will receive the audio data from a previous CPU, condition the data, transmit the data on the local rails and re-transmit the data to the next CPU of the life safety system. For the preferred embodiment, the audio data interface 72 is a daughter board that may be easily installed in the CPU 18.

Figure 4:
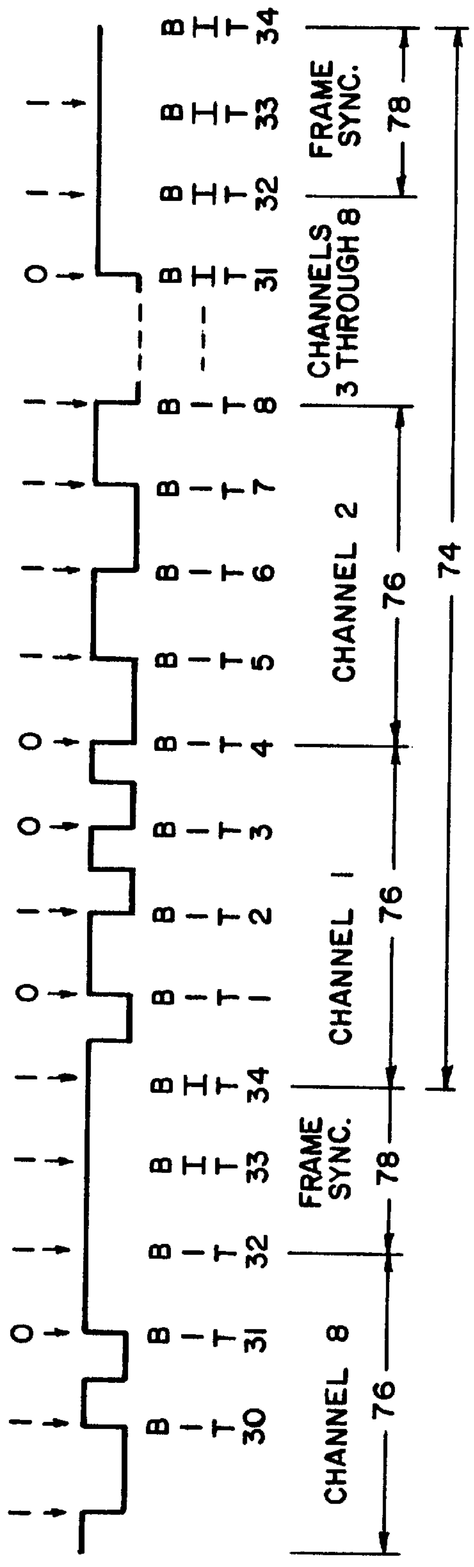
FIG. 4 is a timing diagram for the audio distribution packets used to transmit audio data throughout the life safety system of FIG. 1.

Referring to FIG. 4, digital audio data is distributed in packets or frames 74 to the local rails and to other CPUs using differential digital data transmission. In particular, each frame 74 includes eight channels 76 of digital audio data delimited by a frame sync 78, and each channel uses a differential Manchester. The frame sync 78 is defined by the absence of 2 clock cycles. Thus, each frame 74 comprises thirty-four bits in which each of the eight channels is 4 bits and the frame sync 78 is 2 bits. For the preferred embodiment, the frame sync occurs at a 9600 Hz. rate. In addition, in reference to FIG. 4, a "0" (zero) is defined by a transition occurring in the middle of 2 clock cycles and a "1" (one) is defined by the absence of a transition in the middle of 2 clock cycles. For the preferred embodiment, a new packet or frame 74 is transmitted or received every 104.17 $\mu$sec., i.e. 9600 Hz. This results in a data rate of about 326,400 bps. Data bits of the preferred embodiment are transmitted as pulses with a width of about 1.53 $\mu$sec. for a logic 0 and 3.06 $\mu$sec. for a logic 1.

Figure 5:
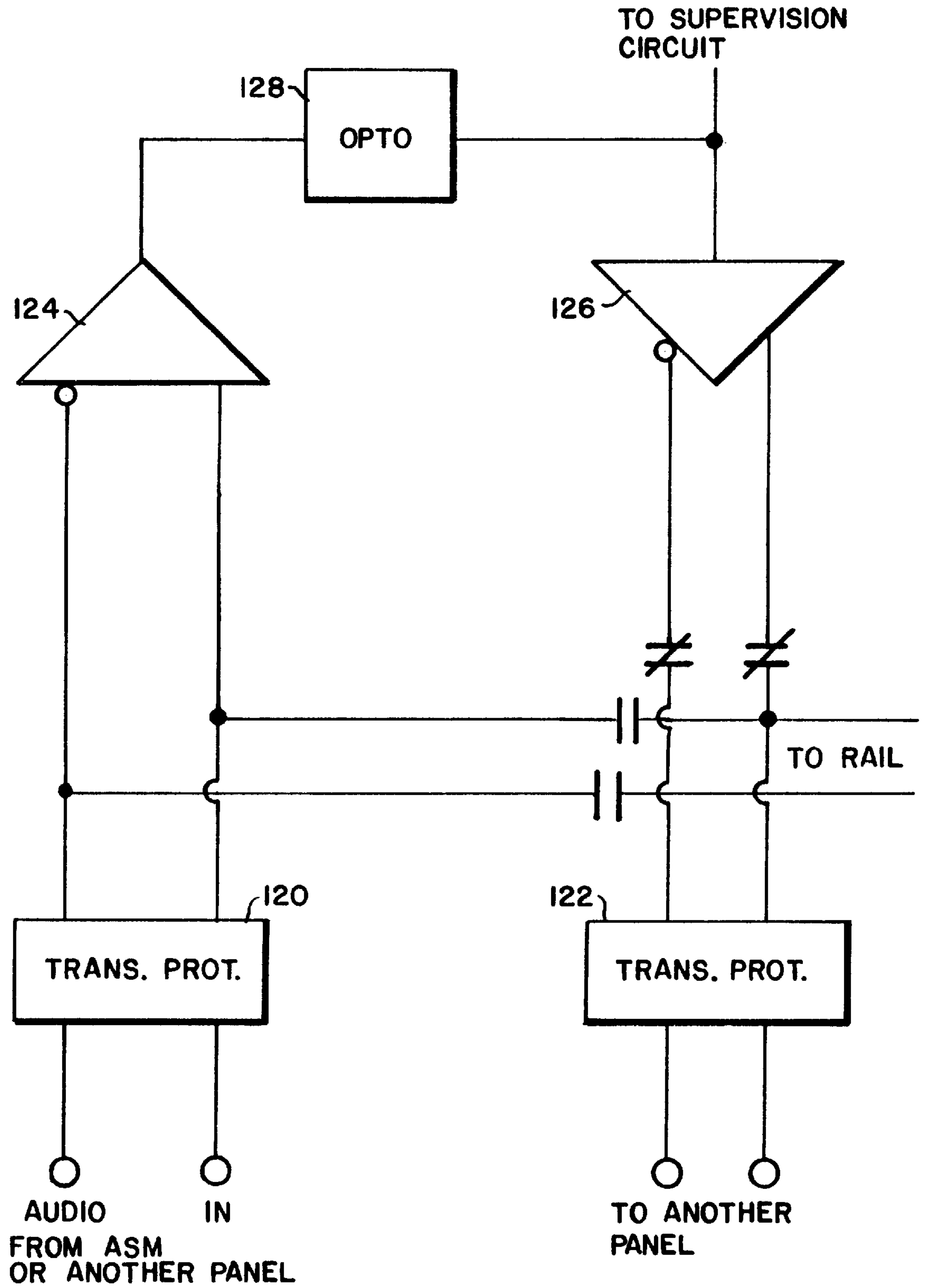
FIG. 5 is a schematic diagram of remote audio data interface of FIG. 3 for isolating and routing audio data.

Referring to FIG. 5, the remote audio data interface 67 (shown in FIG. 3) of the CPU 18 provides isolation and routing of audio data. The data interface 67 comprises a receiving transient protection 120, a driving transient protection 122, a differential receiver 124, a differential driver 126 and an electrical isolator ("Opto") 128. In particular, relay switches, namely differential receiver 124 and differential driver 126, determine if there is a panel failure. If so, the incoming signal received by receiving transient protection 120 is passed to the next panel through the driving transient protection 122. The receiving and driving transient protection 120, 122 protect the circuitry from transients, such as lightning, static and the like. Also, the electrical isolator helps the panel function when a ground fault is present and also helps the system determine where the ground fault is located by isolating the ground fault to an area.

Figure 6:
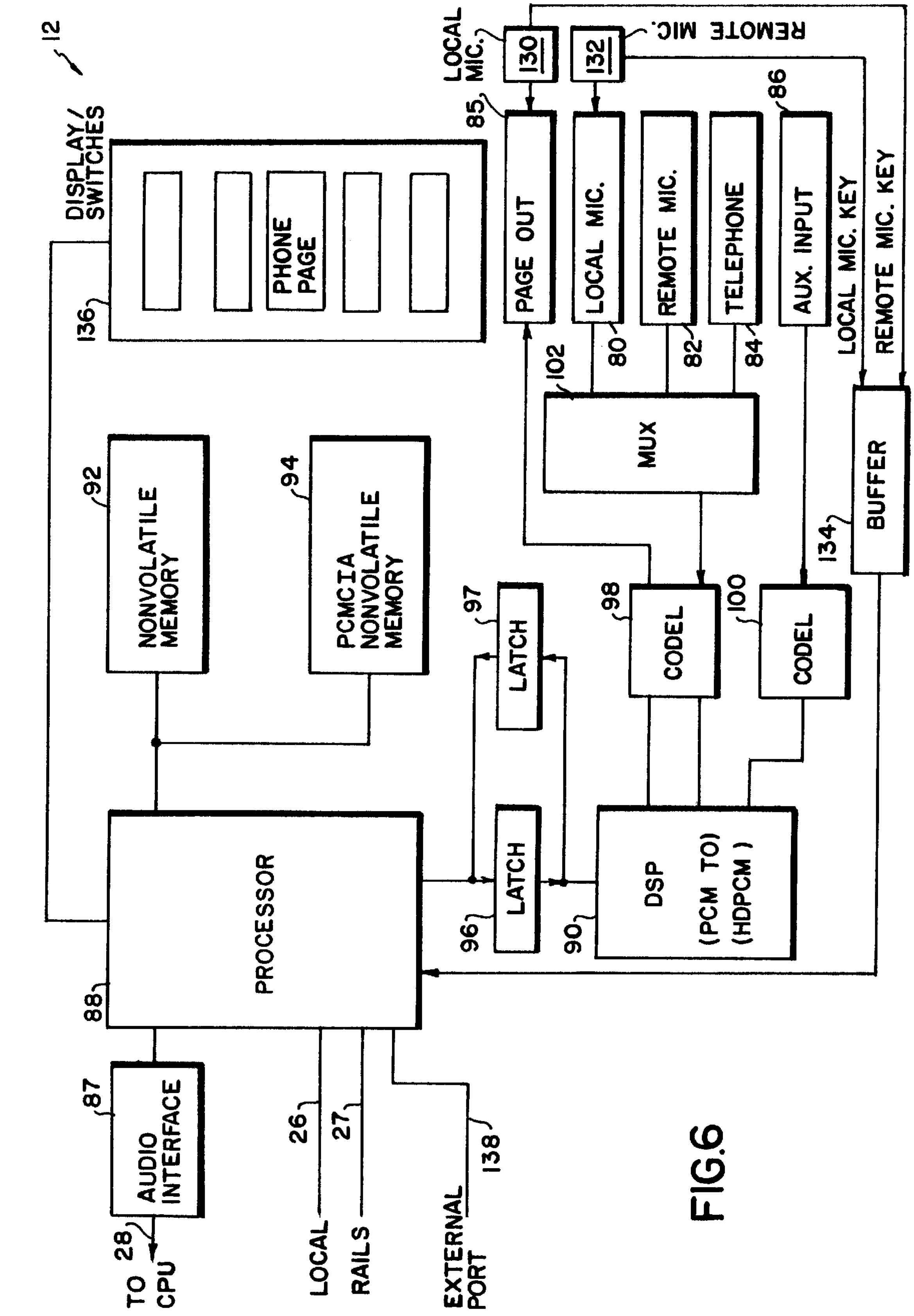
FIG. 6 is a block diagram of the audio source module or unit ("ASU") of FIG. 1.

Referring to FIGS. 1 and 6, the ASU 12 interfaces to the local rails and can generate eight different audio tones and/or messages simultaneously. In particular, the ASU 12 has the ability to multiplex eight audio output channels onto a single output interface to audio amplifier modules 14. The local communication lines for the ASU 12, either the local rails 26, 27 or the local audio data line 28, have the capability of transmitting eight channels of audio data. Preferably, these eight channels include a general channel, page channel, alert channel, evacuation channel and auxiliary channel. Each of the eight audio data channels originate from pre-recorded messages, real-time digital signal processor ("DSP") inputs, or non-active data patterns. For example, a local microphone port 80, remote microphone port 82, telephone port 84 and auxiliary audio device port 86 are supported by an on-board DSP 90 for real-time input. In addition, a page out port 85 provides a select page input as an output.

Still referring to FIG. 6, the ASU 12 includes a processor 88, preferably a 68302 microprocessing unit described above for the CPU 18, that receives execution program code from the CPU at bootup. Preferably, a CPU-to-ASU communication driver, a small download receive module, and an audio message database (not shown) are permanently resident in a nonvolatile memory portion 92 of the ASU 12 while powered down. When the full program is received and activated, processor configuration data is received from the CPU 18.

Audio tones and messages are received from the CPU 18 via the local rails 26, 27 or, if available, the local audio data line 28 shown in FIG. 1. The audio tones or messages may be received from the local audio data line 28 through an audio interface 87 or directly from the local rails 26, 27. In addition, such tones and messages may be generated locally at or near the ASU 12 and distributed to the CPU 18 and other LRMs 24 via the local rails 26, 27 or the local audio data line 28. As stated above, the CPUs 18 also have the capability of transmitting audio data to each other via audio data lines 22. Therefore, no matter where the tones or messages may originate, the audio communication portion 10 of the present invention is capable of distributing them to any and all ASUs 12 in the life safety system.

For the preferred embodiment, the ASU 12 generates eight multiplexed digital audio tones from either prerecorded messages which are stored in nonvolatile memory 92 or from live audio signal from a local microphone 130, a remote microphone 132, a local telephone, or an auxiliary input. The operation of these devices may be monitored by a panel of displays and switches 136. The local microphone 130 and the remote microphone 132 are also coupled to a buffer 134 which leads directly to the processor 88. Prerecorded messages reside in either on-board nonvolatile memory 92 or on a plug-in nonvolatile memory PCMCIA card 94. In particular, default messages contained in on-board nonvolatile memory 92 are downloaded to the ASU 12 when the ASU is manufactured. Also, custom messages are downloaded via an external port 138 from a computer system, usually in the field where the panel arrangement 1 is installed, and additional message capacity may be added by plugging in memory 94 of the PCMCIA card into the ASU 12. The default messages may be supplied in the PCMCIA nonvolatile memory 94 when manufactured or custom messages may be downloaded from a computer system that includes a standard sound card installed therein. In addition, recorded messages are compressed using ADPCM compression, formatted for download to the ASU 12. The ASU 12 takes the recorded messages from either a dedicated external download or from the local rails 26, 27. To download from the local rails 26, 27, the computer system is plugged into the upload/download port on the computer system, the CPU 18 receives the data and places it on the local rails so that the ASU 12 can receive it from the local rails.

To generate live tones or messages for multiplexing tones and messages locally at the ASU 12, the ASU has a local microphone 130 with a push-to-talk ("PTT") switch and three external analog inputs, namely the remote microphone port 82, the telephone port 84 and the auxiliary audio device port 86. Normally, the messages recorded on the computer system are downloaded to the ASU 12, which is less expensive than providing a computer with each ASU. Thus, the computer systems are used as recording studios. In addition, pre-recorded tones and messages are stored in non-volatile memory 92 of the ASU 12. In addition, audio tones and messages may be downloaded from the CPU 18 to the non-volatile memory 92. Thus, downloaded tones and messages will overlay any factory supplied audio tones or messages.

It is to be understood that the present invention may utilize a wide variety of different computer systems to download data to the processor and memory portion of the CPU 18, ASU 12 and audio amplifier 14 of the present invention. For example, one type of computer system is set forth in co-pending U.S. patent application Ser. No. 08/644,478, filed on May 10, 1996 titled Configuration Programming System for a Life Safety Network, which application is owned by the assignee of the present invention. This co-pending application is incorporated herein by reference.

PCMCIA memory 94, based on an interface standard by the Personal Computer Memory Card Industry Association ("PCMCIA") Organization, may be interfaced to the ASU 12 to provide further storage for tones and messages and/or to transfer audio tones and messages to the ASU's processor 88. Such PCMCIA memory 94 may or may not require an actual download process. Upon being plugged in, the PCMCIA Message Database will be mapped to a specific memory region by the processor 88. Any PCMCIA memory 94 plugged-in would disable usage of any factory supplied tones and messages supplied with the ASU 12. If the recording station (computer) has a PCMCIA interface, then the recorded messages may be directly written to the PCMCIA card by the recording station (computer) after, which, the PCMCIA card may be plugged into the ASU. If the recording station does not have a PCMCIA interface, then the messages will have to be downloaded to the ASU from the recording station and the ASU will write the messages to the PCMCIA card.

The processor 88 communicates to the DSP 90 via two 8-bit latches 96, 97 which control the timing for beginning and ending the transfer of audio data. The processor 88 sets up a buffered DMA function to provide ADPCM audio data transfer from the DSP 90 to the internal buffer memory of the processor 88. The DMA transfer through the latches 96, 97 contains two ADPCM audio data samples from a single channel. The processor 88 also directly controls which user audio input device, excluding the auxiliary audio device port 86, is connected to one of the CODECs 98, 100.

The DSP 90 performs ADPCM compressions real time which is then passed to the processor 88 via a parallel interface. The DSP 90 communicates to the processor 88 using an 8-bit protocol. For the preferred embodiment, the DSP 90 is an analog device 2115 running at 14.7456 MHz. If at some point the processor 88 fails, then the DSP 90 will be allowed to process data and shall continue to do read the data from the CODECs 98, 100.

As stated above, audio data may be provided to the ASU 12 via the local microphone port 80, remote microphone port 82, telephone port 84 and auxiliary device port 86. Since the local microphone port 80, remote microphone port 82, and telephone port 84 lead to a single CODEC 98, a multiplexor or MUX 102 is used to select one, and only one, of the three as a paging input to the CODEC. Both CODECs 98, 100 are configured to compand data using u-Law encoding. One CODEC 98 is connected to a paging channel and the other CODEC 100 is connected to an auxiliary channel. The word size from each CODEC 98, 100 is 8 bits. The CODECs 98, 100 code a 14-bit linear sample to an 8-bit companded value. The 8-bit companded value is then be inputted to the ADPCM algorithm of the DSP 90 to yield a two 4-bit ADPCM values for subsequent transmission to the processor 88.

If the ASU local mic. is picked up and keyed, then the ASU will switch the local mic. input into the CODEC via the mux. The CODEC will convert the analog information to a companded 8-bit value. The DSP will take the 8-bit companded value and convert it to a 4-bit ADPCM value. The ADPCM value is then passed to the processor so that it may multiplex the "live" mic. signal in with the other prerecorded message channels and the other "live" channel, i.e., the Aux. input which is also compressed and given to the processor (main CPU). Note that only one of the three paging inputs can be converted at any given time, i.e. paging can occur form either the local mic., remote mic. or telephone. To page by telephone, the user must push the "page by telephone" switch located on the front display/switch panel. To page by remote mic., the remote mic. must be keyed. The priority is local mic., telephone, remote mic. in which the local mic. has the highest priority.

When an alarm condition is detected, this condition is broadcast to all CPU's 18. Each CPU 18 that controls an ASU 12 will inform the ASU to put a particular audio signal on one of the eight audio channels. In addition, each CPU 18 that controls an audio amplifier module 14 informs the audio amplifier module to receive input from a specific channel, send output to its audio devices or speakers 16, and energize its visual circuit.

Figure 7:
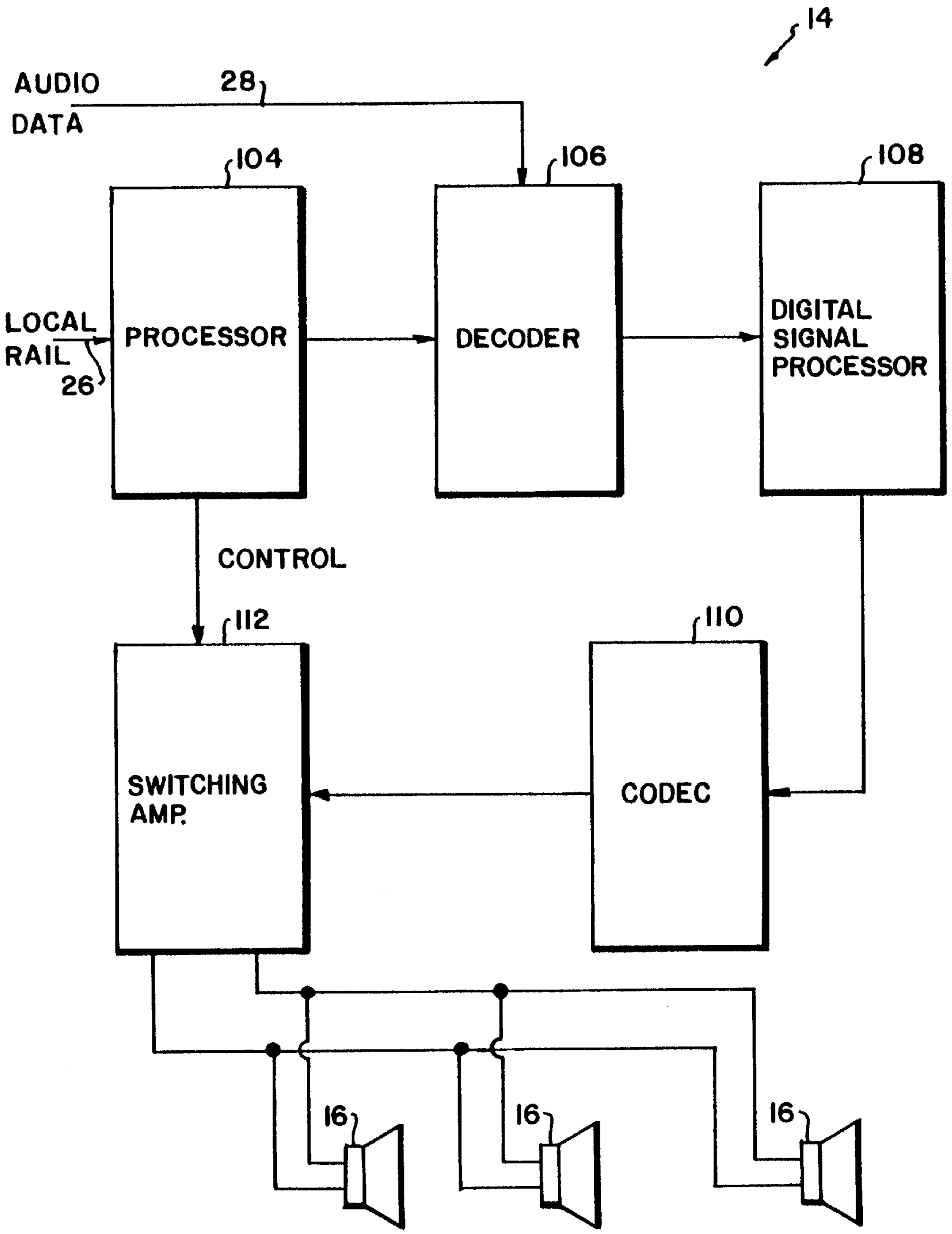
FIG. 7 is a block diagram of the audio amplifier module of FIG. 1.

Referring to FIG. 7, the audio amplifier module 14 is able to select one of eight digitized audio input channels for routing eventually to a group of audio devices or loud speakers 16. The audio amplifier module 14 connects to the local rails 26, 27 such that the CPU 18 controls the inputs and outputs of the audio amplifier module. In the normal supervisory mode, the output circuit of the audio amplifier module 14 supervises the field wiring integrity to the audio devices or speakers 16. If there is a break to the end of line resistor, then the audio amplifier module 14 will inform the CPU 18 of a problem or fault. The audio amplifier module 14 also supervises the connection of the audio data signal. In particular, the audio amplifier module 14 will digitally create a universal evacuation tone if the audio data signal fails. Each audio amplifier module 14 also has one output circuit to drive visual signals (strobe lights) for the hearing impaired.

Each audio amplifier module 14 receives a digital audio signal, selects an audio program, decompresses to signal and converts its back to an analog signal. The audio amplifier module 14 includes a processor 104, decoder 106, digital signal processor ("DSP") 108, CODEC 110 and switching amp 112. As described above, audio data signals from the ASU 12 may be received via the local rails 26, 27 or the local audio data line 28. In addition, control signals from the CPU 18, including the channel address, are received by the audio amplifier module's processor 104 via the local rails 26, 27. Thus, the decoder 106, such as a PAL, shall decode the audio data signals received on the particular channel specified by the control signals to produce 4-bit ADPCM data for one channel. The DSP 108 then processes the 4-bit ADPCM data to produce an 8-bit companded data for one channel. Next, the CODEC 110 processes the 8-bit companded data to produce an analog signal corresponding to a particular audio tone or message. The analog signal is amplified by the switching amp 112 which sends its output to one or speakers 16 for broadcasting the tone or message. The switching amp 112 has four optional audio power output ratings, 15 watts, 30 watts, 45 watts and 60 watts which are specified by the processor 104. In addition, the audio amplifier module 14 has the ability to attenuate input signals by ½ under software control to allow background audio to be output at 50% power output.

When no output is selected, the audio amplifier module 14 has the capability of monitoring the audio zone for AC and DC short and/or open circuit conditions for class A or B connection. The audio amplifier module 14 will monitor it's own performance and has the ability to switch a backup audio signal to the audio devices or loud speakers 16 in the event of a problem or component failure.

There is also an intelligent standby audio amplifier module 14. If the CPU 18 detects that an audio amplifier module 14 has failed, a standby is switched on automatically by the CPU 18. If another audio amplifier module 14 fails, the standby will replace the audio amplifier module with the highest priority in demand. If all communications to the CPU 18 fail and the audio amplifier module 14 detects an activated alarm line, then the audio amplifier module will generate the international evacuation message and send it to the audio devices or speakers 16.

The invention having been thus described with particular reference to the preferred forms thereof, it will be obvious that various changes and modifications may be made therein without departing from the spirit and scope of the invention as defined in the appended claims.

What is claimed is:

1. An audio communication system operative in a life safety network having a plurality of zones interconnected by respective lines for providing audio warnings for a particular zone in said life safety network, the audio communication system comprising:

an audio line for transmitting audio data in a group of packets distributed over a plurality of audio channels to provide differential digital data transmission;

a central processor for controlling transmission of said audio data along said audio line, said central processor including means for selecting a particular channel of said plurality of audio channels for transmitting said audio data;

an audio source, coupled to said audio line, for placing an audio packet on said particular channel selected by said central processor;

an audio amplifier, coupled to said audio line, for receiving a control signal from said central processor that identifies said particular channel and, responsive to said control signal, for retrieving and amplifying said audio packet from said particular channel of said plurality of audio channels; and an audio device for converting said amplified audio packet to an audible sound.

2. The audio communication system of claim 1, further comprising a communication line coupled to said central processor, said audio source and said audio amplifier for transmitting said control signal identifying said particular channel from said central processor to said audio source and said audio amplifier.

3. The audio communication system of claim 1, wherein said audio line has a plurality of audio channels.

4. The audio communication system of claim 1, wherein each packet of said group of packets includes a plurality of channels of audio data separated by a frame sync.

5. The audio communication system of claim 1, wherein said central processor includes an audio data interface for transmitting said signal identifying said particular channel to said audio source and said audio amplifier.

6. The audio communication system of claim 1, wherein said central processor includes means for transmitting said audio packet to said audio source.

7. The audio communication system of claim 1, wherein said audio source includes a memory portion for storing said audio packet and a processor for placing said audio packet on said audio line.

8. The audio communication system of claim 7, wherein said audio source includes a digital signal processor for generating and providing ADPCM values to said processor.

9. The audio communication system of claim 8, wherein said ADPCM values are 4-bit ADPCM values.

10. The audio communication system of claim 8, wherein said audio source includes a CODEC for generating and providing companded values to said digital signal processor.

11. The audio communication system of claim 10, wherein said companded values are 8-bit companded values.

12. The audio communication system of claim 10, wherein said audio source includes means for providing input from at least one device from the group of devices consisting of a local microphone, a remote microphone, a telephone and an auxiliary device.

13. The audio communication system of claim 1, wherein said audio amplifier includes a processor for retrieving said control signal from said central processor identifying said particular channel.

14. The audio communication system of claim 1, wherein said audio amplifier includes a decoder for receiving said audio packet from said particular channel.

15. The audio communication system of claim 14, wherein:

said decoder produces an ADPCM value; and said audio amplifier includes a digital signal processor for converting said ADPCM value to a companded value.

16. The audio communication system of claim 15, wherein said audio amplifier includes a CODEC for converting said companded value to an analog signal.

17. The audio communication system of claim 16, wherein said audio amplifier includes a switching amp for producing an amplified signal from said analog signal and for directing said amplified signal to said audio devices.

18. The audio communication system of claim 1, wherein said audio devices are loud speakers.

* * * * *